(12) United States Patent
Makowski et al.

(10) Patent No.: US 10,144,386 B2
(45) Date of Patent: Dec. 4, 2018

(54) BELLY PAN AND ENERGY ABSORPTION SYSTEM FOR A MOTOR VEHICLE

(71) Applicant: FORD GLOBAL TECHNOLOGIES, LLC, Dearborn, MI (US)

(72) Inventors: Matthew B. Makowski, Northville, MI (US); Aileen M. DeVoe, Royal Oak, MI (US); Se Kyoon Shin, Northville, MI (US); Laike Misikir, Ann Arbor, MI (US); Luis Rafael Reyes Flores, Metepec (MX); Djamal Eddine Midoun, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 14/621,631

(22) Filed: Feb. 13, 2015

(65) Prior Publication Data
US 2016/0236644 A1 Aug. 18, 2016

(51) Int. Cl.
*B60R 21/34* (2011.01)
*B60R 19/00* (2006.01)
*B62D 35/00* (2006.01)

(52) U.S. Cl.
CPC ............ *B60R 21/34* (2013.01); *B60R 19/00* (2013.01); *B60R 2021/343* (2013.01); *B62D 35/005* (2013.01)

(58) Field of Classification Search
CPC ............ B60R 21/34; B60R 2021/343; B60R 2021/0053; B62D 21/15; B62D 21/152; B62D 21/155

USPC ........................... 296/187.04; 280/784
See application file for complete search history.

(56) References Cited

U.S. PATENT DOCUMENTS

| | | | |
|---|---|---|---|
| 6,540,275 B1 | 4/2003 | Iwamoto et al. | |
| 7,434,872 B2 * | 10/2008 | Steller | B60R 19/18 296/155 |
| 7,887,121 B2 * | 2/2011 | Hasegawa | B60R 19/18 293/132 |
| 8,042,847 B2 | 10/2011 | Garg et al. | |
| 8,132,851 B2 | 3/2012 | Steller et al. | |

(Continued)

FOREIGN PATENT DOCUMENTS

| | | |
|---|---|---|
| CN | 202641587 U | 1/2013 |
| CN | 202966228 U | 6/2013 |

(Continued)

OTHER PUBLICATIONS

Definition of "unitary" from dictionary.com accessed May 23, 2017.*

(Continued)

*Primary Examiner* — Hilary L Gutman
(74) *Attorney, Agent, or Firm* — Jsaon Rogers; King & Schickli, PLLC

(57) ABSTRACT

A belly pan is provided for a motor vehicle. The belly pan includes a body having at least one stiffener with a forwardmost zone of peak section force $F_1$, an intermediate zone of peak section force $F_2$ and a rearwardmost zone of peak section force $F_3$ where $F_1 < F_2 < F_3$. Advantageously, the belly pan functions to provide pedestrian protection while simultaneously limiting vehicle damage resulting from a low-speed collision.

16 Claims, 8 Drawing Sheets

(56) References Cited

U.S. PATENT DOCUMENTS

| | | | | |
|---|---|---|---|---|
| 8,449,021 B2* | 5/2013 | Mana | ............ | B60R 19/12 |
| | | | | 293/120 |
| 8,714,294 B2* | 5/2014 | Hasegawa | ............ | B60R 19/18 |
| | | | | 180/274 |
| 8,931,825 B2* | 1/2015 | Oota | ............ | B60R 19/12 |
| | | | | 296/187.04 |
| 9,327,662 B1* | 5/2016 | Hammer | ............ | B60R 19/12 |
| 9,650,077 B2* | 5/2017 | Lim | ............ | B62D 21/155 |
| 2002/0125725 A1* | 9/2002 | Satou | ............ | B60R 19/18 |
| | | | | 293/132 |
| 2007/0046043 A1* | 3/2007 | Ito | ............ | B60R 19/18 |
| | | | | 293/120 |
| 2007/0085356 A1* | 4/2007 | Itou | ............ | B60R 21/34 |
| | | | | 293/120 |
| 2007/0138815 A1* | 6/2007 | Fukukawa | ............ | B60R 19/12 |
| | | | | 293/15 |
| 2008/0001433 A1* | 1/2008 | Noyori | ............ | B60R 19/12 |
| | | | | 296/187.04 |
| 2014/0306482 A1* | 10/2014 | Corwin | ............ | B60R 19/12 |
| | | | | 296/180.1 |
| 2015/0054307 A1* | 2/2015 | Kito | ............ | B60R 21/34 |
| | | | | 296/187.04 |
| 2015/0336615 A1* | 11/2015 | Lim | ............ | B62D 21/155 |
| | | | | 296/187.09 |

FOREIGN PATENT DOCUMENTS

| | | | | |
|---|---|---|---|---|
| DE | 102005030419 A1 * | 1/2007 | ............ | B60R 19/40 |
| DE | 102007019481 A1 | 11/2008 | | |
| DE | 202009017309 U1 | 3/2010 | | |
| DE | 102010049353 A1 | 6/2011 | | |
| EP | 1300293 A1 * | 4/2003 | ............ | B60R 19/12 |
| EP | 1419936 A1 * | 5/2004 | ............ | B60R 19/12 |
| EP | 1300293 B1 | 12/2004 | | |
| JP | 2002274298 A * | 9/2002 | | |

OTHER PUBLICATIONS

Definition of "integrate" from dictionary.com accessed May 23, 2017.*
English Translation of DE102010049353A1.
English Translation of DE202009017309U1.
English Translation of EP1300293B1.
English Translation of DE102007019481A1.
English Translation of CN202966228U.
English Machine Translation of CN202641587U.
English Machine Translation of CN202966228U.

* cited by examiner

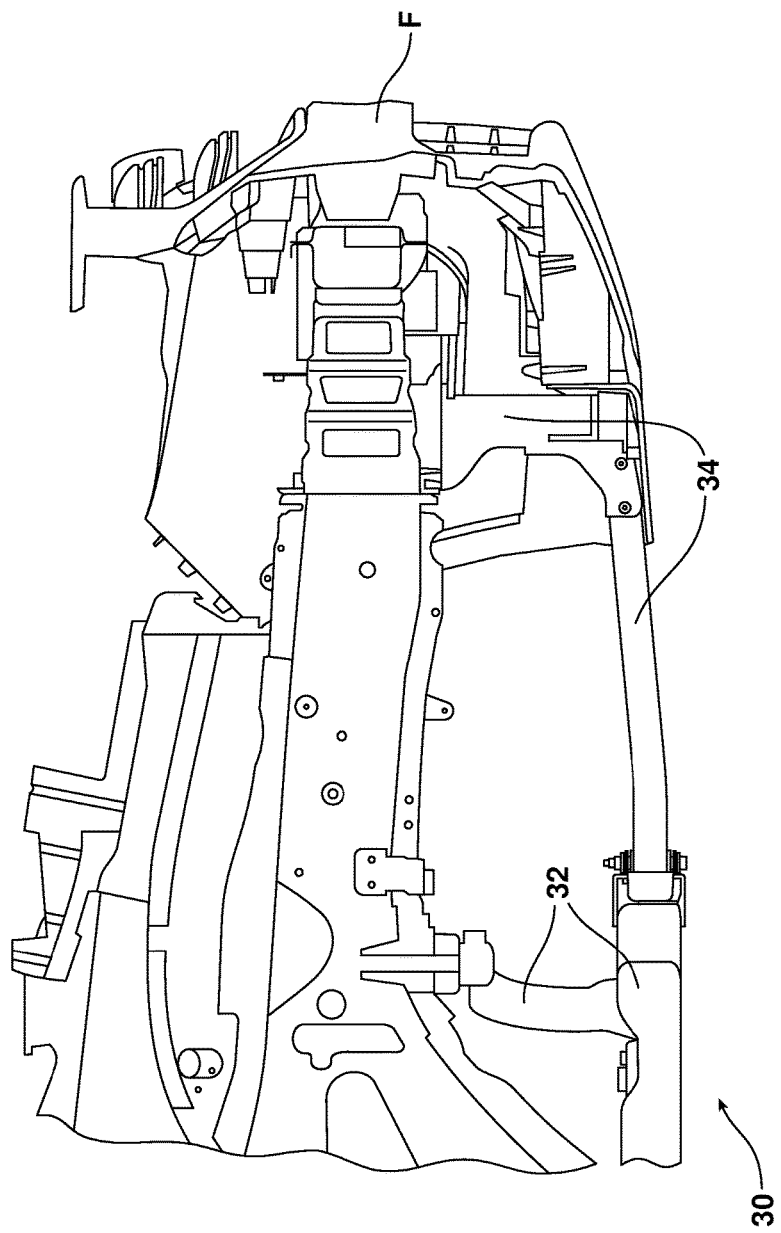

BELLY PAN AND ENERGY ABSORPTION SYSTEM FOR A MOTOR VEHICLE

TECHNICAL FIELD

This document relates generally to the motor vehicle field and, more particularly, to a belly pan, an energy absorption system and a method for enhancing pedestrian safety while minimizing low-speed collision damage to a motor vehicle.

BACKGROUND

In any frontal collision, regardless of the type of barrier (e.g. tree, vehicle, pedestrian), there is a fundamental challenge of managing energy absorption and dissipation. There is a delicate balance that must be achieved. In low-speed frontal impacts (less than 15 mph) involving vehicles and other barriers (e.g. parking lots incidents), the emphasis is on reducing the number of components damaged in order to minimize the repair cost. However, in cases where the vehicle strikes a pedestrian, emphasis is on keeping the front end of the vehicle soft in order to reduce the risk of injury to the leg and head regions. To achieve these seemingly conflicting goals, the front fascia needs to be designed to strike a balance. The profile and the materials used to construct the fascia are the key contributors to the front fascia stiffness. This document relates to a unique, energy absorbing lower front fascia or "belly pan" and an overall energy absorption system that provides the optimal balance of energy absorption and dissipation.

SUMMARY

In accordance with the purposes and benefits described herein, a belly pan is provided for a motor vehicle. That belly pan comprises a body including at least one stiffener having a forwardmost zone with a peak section force $F_1$, an intermediate zone with a peak section force $F_2$ and a rearwardmost zone with a peak section force $F_3$ wherein $F_1<F_2<F_3$. At least one stiffener is integrated into the body by unitary construction.

In one possible embodiment, the body and the at least one integral stiffener are molded from a material selected from the group consisting of polypropylene, reinforced polypropylene, steel and combinations thereof. In one possible embodiment, the body of the belly pan includes two stiffeners, one stiffener being provided adjacent each lateral end of the belly pan.

In one possible embodiment, the forwardmost zone has a first peak section force $F_1$ of between about 3 kN and about 5 kN. The intermediate zone has a second peak section force $F_2$ of between about 10.5 kN and about 12.5 kN. The rearwardmost zone has a third peak section force $F_3$ of between about 15 kN and about 17 kN.

In accordance with an additional aspect, an energy absorption system is provided for a motor vehicle. That system comprises a vehicle frame including in lower load path and a belly pan forward of the lower load path. The belly pan has a body including a stiffener having a forwardmost zone with a peak section force $F_1$, an intermediate zone with a peak section force $F_2$ and a rearwardmost zone with a peak section force $F_3$ wherein $F_1<F_2<F_3$. More specifically, the stiffener is aligned with the lower load path. In one possible embodiment, the stiffener is integrated into the body by unitary construction.

In accordance with still another aspect, a method is provided for enhancing pedestrian safety while minimizing low-speed collision damage to the motor vehicle. That method may be broadly described as comprising the step of equipping the motor vehicle with a belly pan providing gradually increasing levels of stiffness from a forwardmost zone to a rearwardmost zone.

Still further, the method may include providing the belly pan with at least one stiffener having a forwardmost zone with a peak section force $F_1$, an intermediate zone with a peak section force $F_2$ and a rearwardmost zone with a peak section force $F_3$ where $F_1<F_2<F_3$.

Still further, the method may include the step of tuning stiffness characteristics of the first zone, the second zone and the third zone to desired levels by using different materials for construction of the different zones, using different profiles of material for the different zones or using both different materials and different profiles of materials for the different zones. In accordance with one embodiment of the method, the forwardmost zone is tuned to have a peak section force $F_1$ of between about 3 kN and about 5 kN, the intermediate zone is tuned to have a peak section force $F_2$ of between about 10.5 kN and about 12.5 kN, and the rearwardmost zone is tuned to have a peak section force $F_3$ of between about 15. kN and about 17 kN.

Further, the method may include providing the belly pan with two stiffeners. Further, the method may include aligning a first of the two stiffeners with a lower load path on a first side of the motor vehicle and a second of the two stiffeners with the lower load path on a second side of the motor vehicle.

In the following description, there are shown and described several preferred embodiments of the belly pan and energy absorption system. As it should be realized, the belly pan and energy absorption system are capable of other, different embodiments and their several details are capable of modification in various, obvious aspects all without departing from the belly pan and energy absorption system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the belly pan and energy absorption system and together with the description serve to explain certain principles thereof. In the drawing figures:

FIG. 2a is a side elevational view of the energy absorption system including the lower load path and belly pan. Showing how the stiffeners of the belly pan are aligned with the lower load path.

FIG. 2b is a perspective view of the energy absorption system illustrated in FIG. 2a.

Reference will now be made in detail to the present preferred embodiments of the belly pan and energy absorption system, examples of which are illustrated in the accompanying drawing figures.

DETAILED DESCRIPTION

Figure 1:
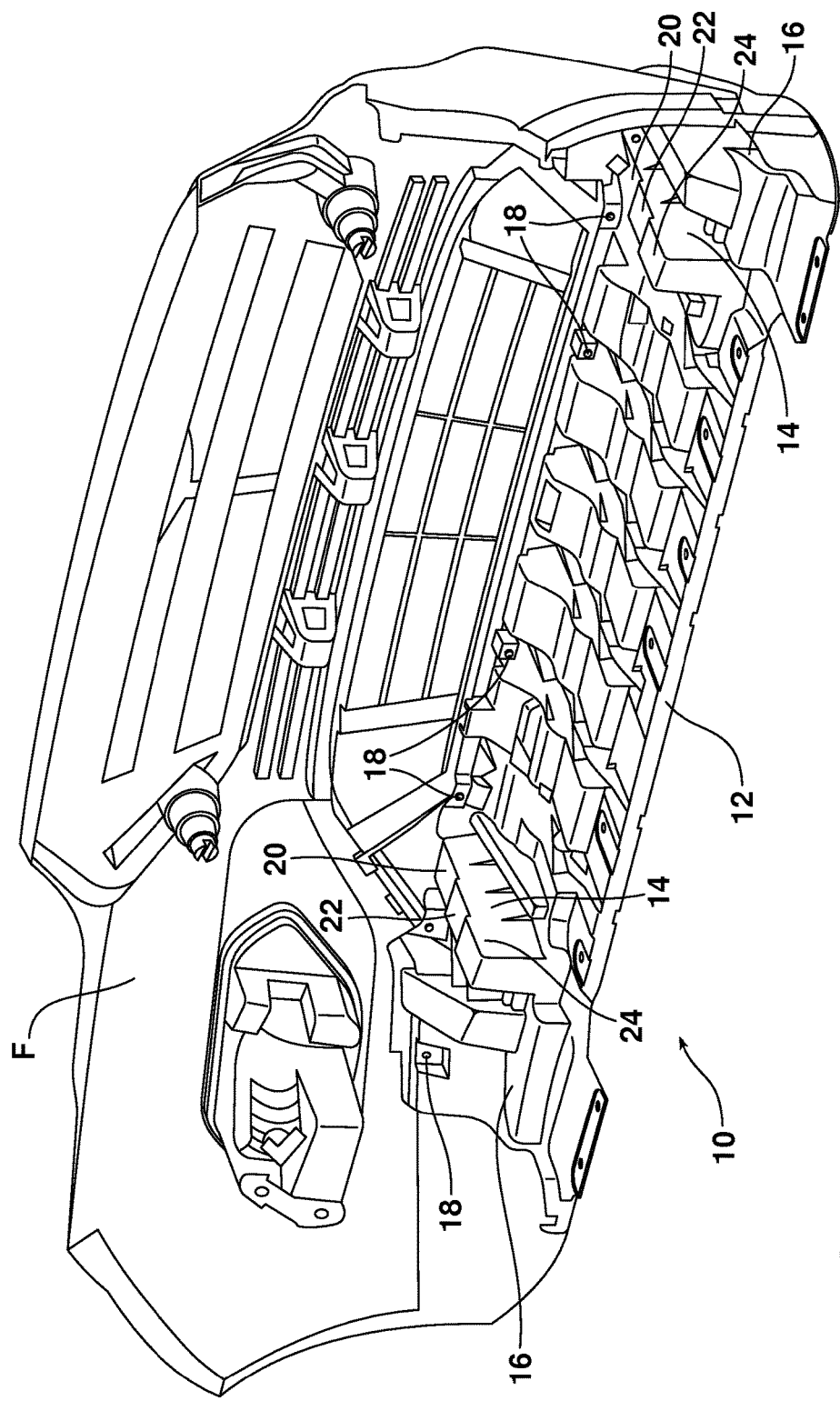
FIG. 1 is a rear perspective view of the lower front fascia or belly pan that is the subject matter of this document.

Reference is now made to FIG. 1 illustrating the lower front fascia or belly pan 10. As illustrated, the belly pan 10 includes a body 12 incorporating two stiffeners 14. In the illustrated embodiment, the body 12 and stiffeners 14 are integrally formed as a unitary construction. In one possible embodiment, the body 12 and stiffeners 14 are integrally molded from a material selected from a group consisting of polypropylene, reinforced polypropylene, steel and combinations thereof. Useful reinforcing materials include, but are not limited to, glass fibers, long glass fibers, carbon fibers and carbon nanotubes. As illustrated one stiffener 14 is provided adjacent each lateral end 16 of the belly pan 10. The body 12 between the stiffeners 14 may include a stepped profile of the type illustrated so that it will crush in a desired, controlled manner in the event of an impact to the front of the vehicle. Fasteners 18 are utilized at spaced locations to secure the belly pan 10 in position to the front fascia F of the motor vehicle.

Figure 5:
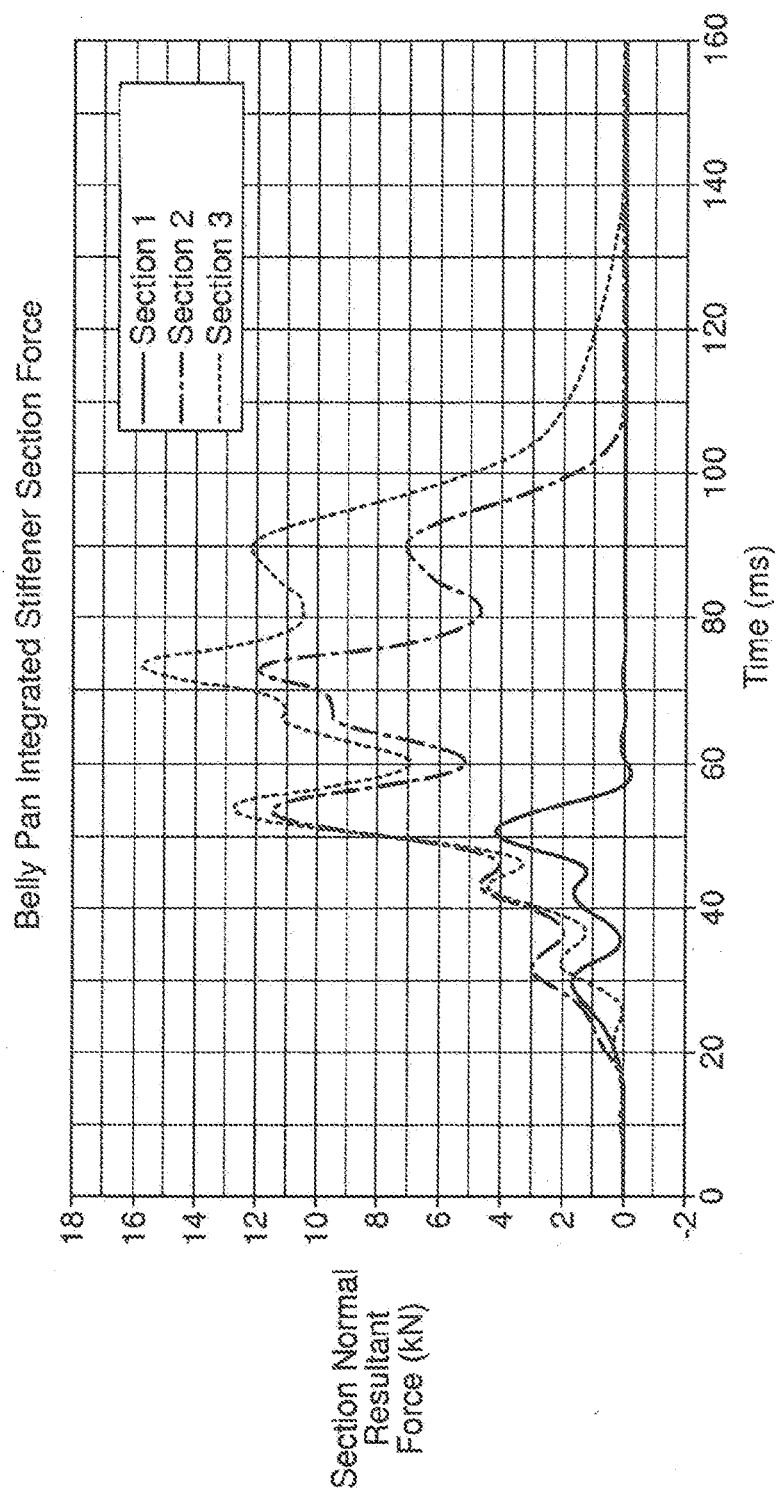
FIG. 5 is a graph of section normal resultant force versus time.

As further illustrated in FIG. 1, each stiffener 14 has a forwardmost zone 20, an intermediate zone 22 and a rearwardmost zone 24. These zones 20, 22, 24 provide gradually increasing levels of stiffness from the forwardmost zone 20 to the rearwardmost zone 24. Thus, the forwardmost zone 20 has a peak section force $F_1$, the intermediate zone 22 has a peak section force $F_2$ and the rearwardmost zone has a peak section force $F_3$ where $F_1 < F_2 < F_3$. In one possible embodiment, the forwardmost zone 20 has a peak section force $F_1$ of between about 3 kN and about 5 kN. The intermediate zone 22 is a peak section force $F_2$ of between about 10.5 kN and about 12.5 kN. The rearwardmost zone 24 has a peak section force $F_3$ of between about 15 kN and about 17 kN. In one possible embodiment, the forwardmost zone 20 has a peak section force $F_1$ of about 4 kN, the intermediate zone 22 has a peak section force $F_2$ of about 11.5 kN and the rearwardmost zone 24 has a peak section force $F_3$ of about 16 kN. Thus the ratio of peak section force $F_1$ to $F_2$ to $F_3$ is about 1 to 2.875 to 4. See also graph in FIG. 5.

Figure 2B:
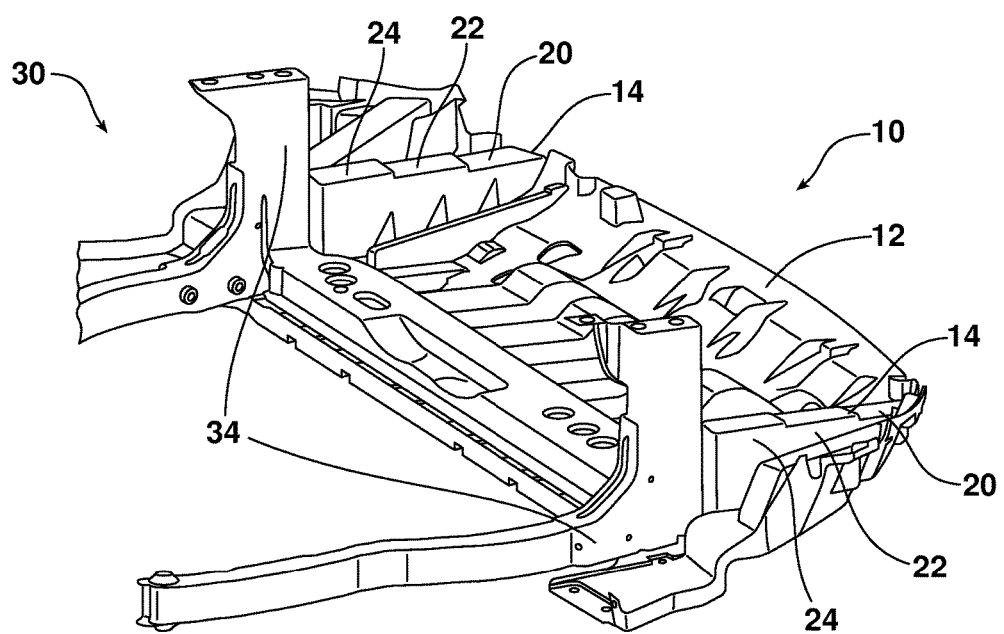

Reference is now made to FIGS. 2a and 2b illustrating an energy absorption system 30 for a motor vehicle. As illustrated, the energy absorption system 30 comprises a vehicle frame or front subframe 32 including a lower load path 34.

As further illustrated, the energy absorption system 30 includes the belly pan 10 of FIG. 1 which bridges between the front fascia F of the motor vehicle and the lower load path 34. More specifically, one stiffener 14 is aligned with each individual member of the lower load path 34. As previously pointed out, each stiffener 14 includes a forwardmost zone 20 with a first peak section force $F_1$, and intermediate zone 22 with a second peak section force $F_2$ and a rearwardmost zone 24 with a third peak section force $F_3$ where $F_1 < F_2 < F_3$.

In the illustrated embodiment, the forwardmost zone 20 has a lower/smaller profile than the intermediate zone 22 which has a lower/smaller profile than the rearwardmost zone 24. Here it should be appreciated that the stiffness of each zone 20, 22, 24 may be tuned using different profiles of material for each different zone, using different materials for the construction of each different zone or using both different profiles of materials and different materials for each different zone.

The belly pan 10 and energy absorption system 30 function in accordance with a new and improved method to enhance pedestrian safety while simultaneously minimizing low-speed collision damage to a motor vehicle. This method may be broadly described as including the steps of equipping the motor vehicle with the belly pan 10 which provides gradually increasing levels of stiffness from the forwardmost zone 22 to the rearwardmost zone 24. As previously noted, the belly pan 10 includes integral stiffeners 14 that are aligned with the load path 34. The stiffness characteristics of the zones 20, 22, 24 are tuned to provide levels of stiffness necessary to provide the best possible energy management to protect pedestrians in the event of a pedestrian impact while also minimizing component damage and repair costs in the event of a low-speed collision.

Figure 3A:
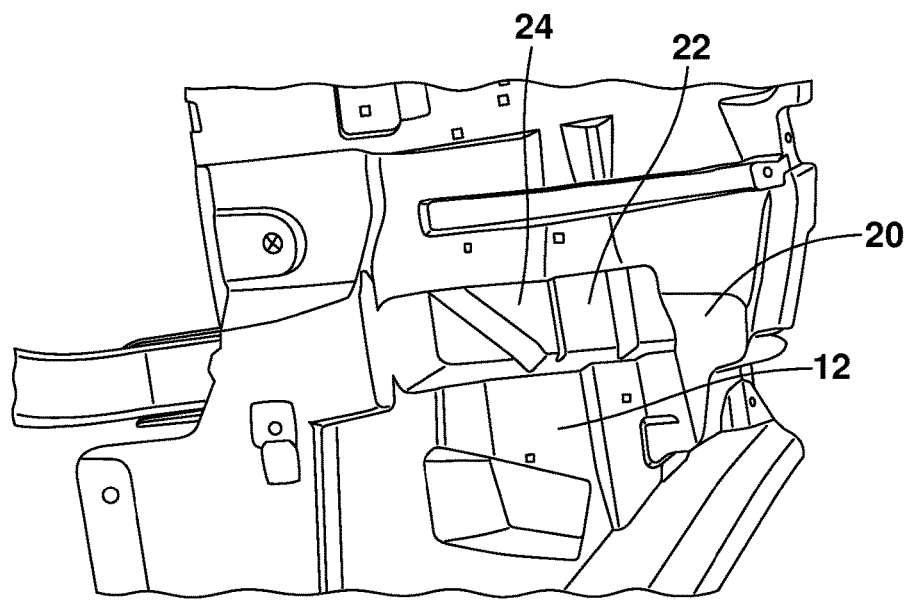
FIGS. 3a and 3b are schematic illustrations of the performance provided by the belly pan in the event of a pedestrian impact.
Figure 3A:
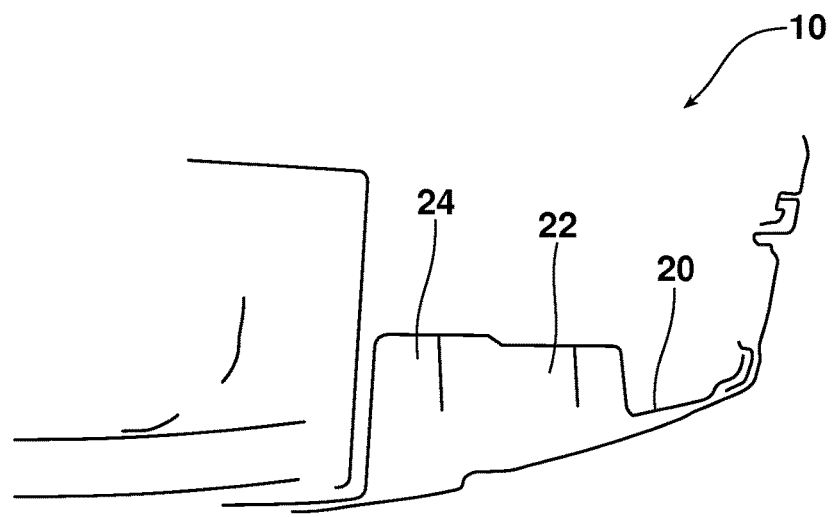
Figure 3B:
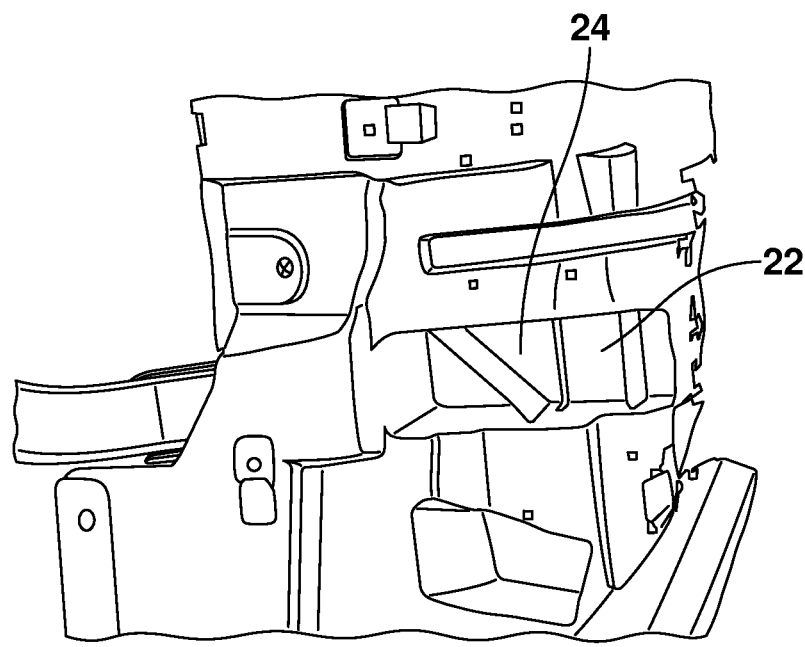
Figure 3B:
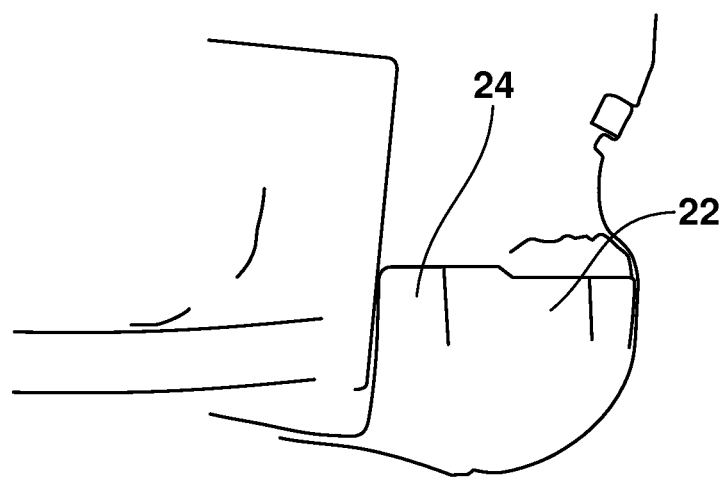

Reference is now made to FIGS. 3a and 3b which illustrate pedestrian protection in the event of a frontal impact with a pedestrian. More specifically, FIG. 3a illustrates one stiffener 14 of the belly pan 10 at time T=0 ms. One can clearly see in this figure the relatively low profile forwardmost zone 20, the intermediate profile intermediate zone 22 and the larger profile rearwardmost zone 24 of the stiffener.

FIG. 3b illustrates a pedestrian impact at time T=50 ms. As one should appreciate from reviewing this figure, the forwardmost zone 20 of peak section force $F_1$ has completely crumbled thereby providing energy absorption to protect the pedestrian at impact. Stated another way, the soft, crushable forwardmost zone 20 has been tuned to support the lower leg and reduce rotation in order to protect the pedestrian in this circumstance.

Figure 4A:
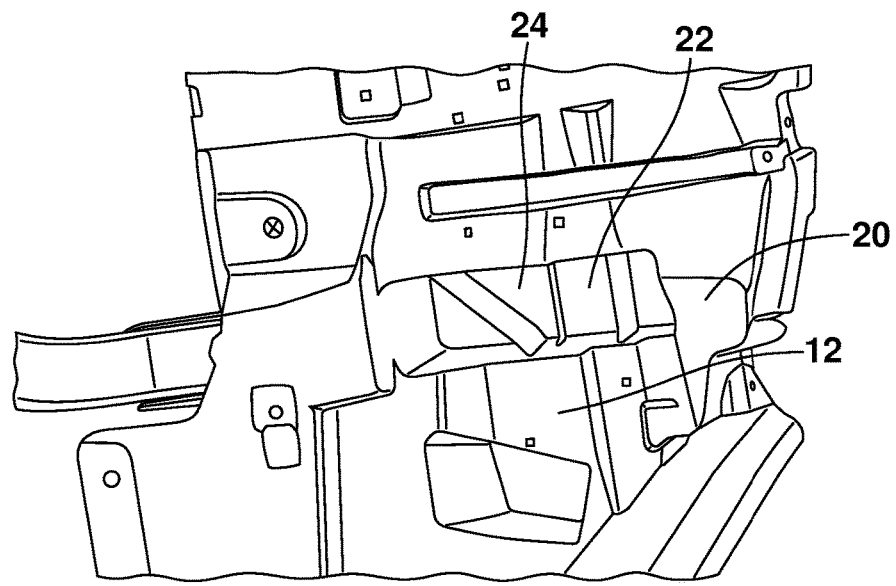
FIGS. 4a and 4b are schematic illustrations of the performance of the belly pan in the event of a low-speed collision during which the belly pan minimizes vehicle damage and repair costs.
Figure 4A:
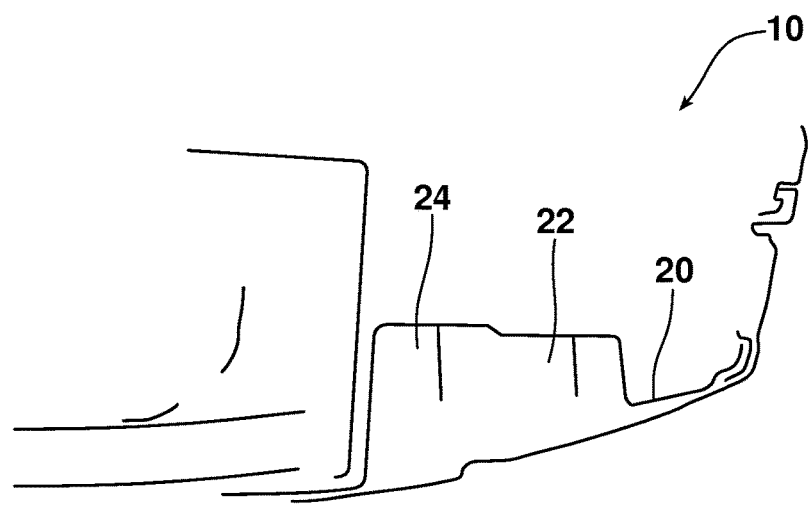
Figure 4B:
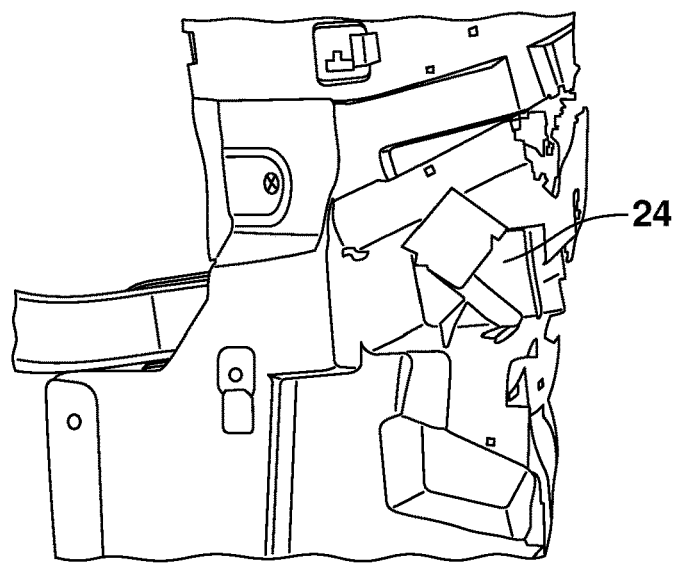
Figure 4B:
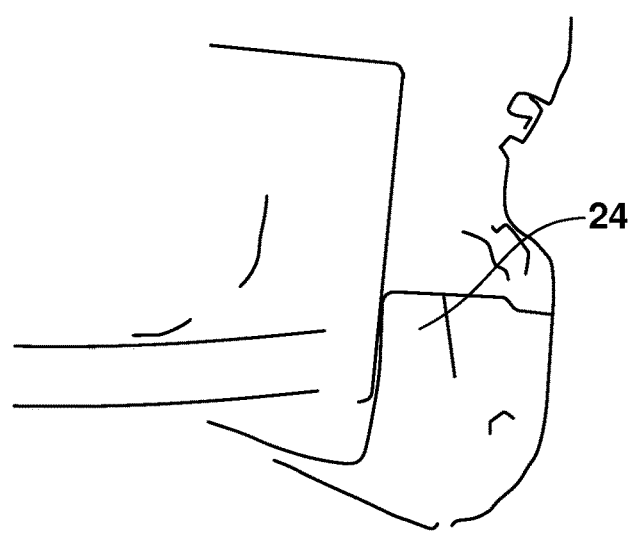

Reference is now made to FIGS. 4a and 4b, illustrating how the belly pan 10 functions to minimize damage and repair costs in the event of a low-speed impact with another object such as another car in a parking lot. More specifically FIG. 4a illustrates the belly pan 10 and stiffener 14 immediately prior to the impact at time T=0 ms. In contrast, FIG. 4b illustrates the belly pan 10 and stiffener 14 at time T=90 ms after the impact. Here it should be noted how the first and second zones 20, 22 of the stiffener had been crushed but the rearwardmost zone 24 of greatest stiffness has directed the impact load straight into the aligned lower load path 34, resisting further crushing and thereby preventing additional damage to the frontend components of the motor vehicle. Stated another way, the forwardmost zone 20 of least stiffness is readily crushed by the impact. The intermediate zone 22 of intermediate stiffness has been tuned to be semi-crushable and, accordingly, absorbs the low-speed energy from the impact. In contrast, the rearwardmost zone 24 has been tuned to be relatively rigid to thereby prevent additional damage to frontend components.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A belly pan for a motor vehicle, comprising: a body including at least one stiffener having a continuous uppermost surface having a stepped profile, said at least one stiffener having the stepped profile including a forwardmost zone with a peak section force $F_1$, an intermediate zone with a peak section force $F_2$ and a rearwardmost zone with a peak section force $F_3$ wherein $F_1 < F_2 < F_3$, wherein said at least one stiffener is integrated into said body at only a lateral edge of the body by unitary construction.

2. The belly pan of claim 1, wherein said body and said at least one stiffener are molded from a material selected from a group consisting of polypropylene, reinforced polypropylene, steel and combinations thereof.

3. The belly pan of claim 1, including two stiffeners, one stiffener of said two stiffeners being provided adjacent each lateral end of said belly pan.

4. The belly pan of claim 1, wherein said first peak section force $F_1$ is between about 3 kN and about 5 kN.

5. The belly pan of claim 4, wherein said second peak section force $F_2$ is between about 10.5 kN and about 12.5 kN.

6. The belly pan of claim 5, wherein said third peak section force $F_3$ is between about 15 kN and about 17 kN.

7. An energy absorption system for a motor vehicle, comprising a vehicle frame including a lower load path; and a belly pan forward of said lower load path,
said belly pan having a body including at least one stiffener at only a lateral edge of the body, the at least one stiffener having a continuous uppermost surface having a stepped configuration, a forwardmost zone with a peak section force $F_1$, an intermediate zone with a peak section force $F_2$ and a rearwardmost zone with a peak section force $F_3$ where $F_1<F_2<F_3$, wherein said at least one stiffener having a stepped configuration is aligned with said lower load path adjacent a lateral end of the belly pan.

8. The system of claim 7 wherein said at least one stiffener is integrated into said body by unitary construction.

9. The system of claim 8 wherein said peak section force $F_1$ is between about 3 kN and about 5 kN.

10. The system of claim 9, wherein said peak section force $F_2$ is between about 10.5 kN and about 12.5 kN.

11. The cup holder system of claim 10, wherein said peak section force $F_3$ is between about 15 kN and about 17 kN.

12. A method of enhancing pedestrian safety while minimizing low speed collision damage to a motor vehicle, comprising:
equipping said motor vehicle with a belly pan providing gradually increasing levels of stiffness from a forwardmost zone to a rearward most zone; and
providing said belly pan with at least one integral stiffener at only a lateral edge of the belly pan, the at least one stiffener having a continuous uppermost surface having a stepped configuration aligned with a lower load path of the motor vehicle, a forwardmost zone with a peak section force $F_1$, an intermediate zone with a peak section force $F_2$ and a rearwardmost zone with a peak section force $F_3$ where $F_1<F_2<F_3$.

13. The method of claim 12, including tuning stiffness characteristics of said forwardmost zone, said intermediate zone and said rearwardmost zone to desired levels by (a) using different materials for construction of said forwardmost zone, said intermediate zone and said rearwardmost zone, (b) using different profiles of material for said forwardmost zone, said intermediate zone and said rearwardmost zone, or (c) using both different materials and different profiles of materials for said forwardmost zone, said intermediate zone and said rearwardmost zone.

14. The method of claim 12, including tuning said forwardmost zone to have a peak section force $F_1$ of between about 3 kN and about 5 kN, said intermediate zone to have a peak section force $F_2$ of between about 10.5 kN and about 12.5 kN and said rearwardmost zone to have a peak section force $F_3$ of between about 15 kN and about 17 kN.

15. The method of claim 12, including providing said belly pan with two stiffeners.

16. The method of claim 15, including aligning a first of said two stiffeners with a lower load path on a first side of the motor vehicle and aligning a second of said two stiffeners with said lower load path on a second side of the motor vehicle.

* * * * *